United States Patent
Sandford

(10) Patent No.: US 11,123,706 B2
(45) Date of Patent: Sep. 21, 2021

(54) TWO-STAGE LIQUID DISTRIBUTION DEVICE FOR MASS TRANSFER COLUMN

(71) Applicant: Koch-Glitsch, LP, Wichita, KS (US)

(72) Inventor: Neil Sandford, Wichita, KS (US)

(73) Assignee: Koch-Glitsch, LP, Wichita, KS (US)

(*) Notice: Subject to any disclaimer, the term of this patent is extended or adjusted under 35 U.S.C. 154(b) by 38 days.

(21) Appl. No.: 16/822,003

(22) Filed: Mar. 17, 2020

(65) Prior Publication Data

US 2020/0306720 A1    Oct. 1, 2020

Related U.S. Application Data

(60) Provisional application No. 62/824,355, filed on Mar. 27, 2019.

(51) Int. Cl.
*B01J 19/32* (2006.01)
*F28C 3/08* (2006.01)
*B01D 3/00* (2006.01)

(52) U.S. Cl.
CPC .............. *B01J 19/32* (2013.01); *F28C 3/08* (2013.01); *B01D 3/008* (2013.01); *B01J 2219/332* (2013.01)

(58) Field of Classification Search
CPC ........ B01D 3/008; B01D 53/185; B01J 19/32; B01J 2219/332; B01J 2219/3325; F28C 3/08
USPC .................................................. 261/97, 110
See application file for complete search history.

(56) References Cited

U.S. PATENT DOCUMENTS

| 4,557,877 A | * | 12/1985 | Hofstetter | B01D 3/008 239/450 |
| 4,565,216 A | | 1/1986 | Meier | |
| 4,994,210 A | * | 2/1991 | Lucero | B01D 53/185 261/110 |
| 5,354,460 A | * | 10/1994 | Kearney | B01D 3/008 210/198.2 |

(Continued)

FOREIGN PATENT DOCUMENTS

| AU | 2012266821 B2 | 3/2017 |
| FR | 3 065 171 A1 * | 10/2018 |
| WO | WO 2012/167888 A1 * | 12/2012 |

OTHER PUBLICATIONS

International Search Report and Written Opinion received for PCT patent application No. PCT/IB2020/052407, dated May 7, 2020, 10 pages.

*Primary Examiner* — Charles S Bushey

(57) ABSTRACT

A two-stage liquid distribution device for use within an internal region of a mass transfer column to distribute liquid to an underlying mass transfer bed. The two-stage liquid distribution device includes a lower distributor with a lower parting box and lower troughs and an upper distributor with an upper parting box and upper troughs. The lower and upper parting boxes and troughs are enclosed to allow a liquid head in a lower downpipe section and an upper downpipe section that feed liquid to the lower distributor and the upper distributor to cause pressurization of liquid within the lower and upper parting boxes and troughs. The pressurization makes the lower and upper distributors less susceptible to rocking motion of the mass transfer column and reduces any maldistribution of liquid discharged from the lower and upper troughs to the mass transfer bed.

20 Claims, 6 Drawing Sheets

(56) References Cited

U.S. PATENT DOCUMENTS

| | | | |
|---|---|---|---|
| 7,207,445 B2* | 4/2007 | Manna | B01D 11/0449 |
| | | | 208/203 |
| 10,201,766 B2* | 2/2019 | Haroun | B01D 3/24 |
| 2004/0020238 A1 | 2/2004 | Kalbassi | |
| 2004/0086435 A1* | 5/2004 | Boyer | B01D 53/185 |
| | | | 422/220 |
| 2017/0312650 A1* | 11/2017 | Augier | B01D 3/008 |
| 2018/0318727 A1* | 11/2018 | Perdu | B01J 8/0492 |
| 2019/0126195 A1* | 5/2019 | Weiss | B01D 53/1475 |
| 2020/0155960 A1* | 5/2020 | Duparc | B01D 53/185 |

* cited by examiner

TWO-STAGE LIQUID DISTRIBUTION DEVICE FOR MASS TRANSFER COLUMN

RELATED APPLICATION

This application claims priority to Provisional Application No. 62/824,355, filed on Mar. 27, 2019, which is incorporated by reference in its entirety.

TECHNICAL FIELD

The present invention relates generally to columns in which mass transfer and heat exchange are intended to occur and, more particularly, to liquid distributors used within the mass transfer columns to uniformly distribute liquid to an underlying mass transfer zone and methods of delivering the liquid from the liquid distributors to the mass transfer zone.

BACKGROUND ART

Mass transfer columns are configured to contact at least two fluid streams in order to provide product streams of specific composition and/or temperature. The term "mass transfer column," as used herein is intended to encompass columns in which mass and/or heat transfer is the primary objective. Some mass transfer columns, such as those utilized in multicomponent distillation and absorption applications, contact a gas-phase stream with a liquid-phase stream, while others, such as extraction columns, may be designed to facilitate contact between two liquid phases of different densities. Oftentimes, mass transfer columns are configured to contact an ascending vapor or liquid stream with a descending liquid stream, usually along or above the surfaces of mass transfer structures that are placed in the interior region of the column to facilitate intimate contact between the two fluid phases. The rate and/or degree of mass and heat transferred between the two phases is enhanced by these mass transfer structures, which may be in the form of various types of trays, structured packing, random packing, or grid packing.

Mass transfer columns are used in stationary onshore applications as well as non-stationary offshore applications such as floating production storage and offloading(FPSO) platforms or vessels and floating liquefied natural gas (FLNG) vessels. When used in non-stationary offshore applications, the mass transfer columns may be subjected to wave and/or wind induced motion that causes rocking of the mass transfer columns and sloshing of the liquid streams within the mass transfer columns. This sloshing of the liquid streams can lead to uneven horizontal distribution of the liquid stream as it is delivered by a liquid distributor to an underlying packing bed and thereby decreasing the mass transfer and/or heat exchange between the liquid and vapor steams within the packing bed. A need has thus developed for an improved liquid distributor that is less susceptible to sloshing of the liquid stream and is able to reduce any maldistribution of liquid as it enters the underlying packing bed.

SUMMARY OF INVENTION

In one aspect, the present invention is directed to a two-stage liquid distribution device for use in an internal region of a mass transfer column. The two-stage liquid distribution device includes a lower distributor comprising: a plurality of elongated, enclosed lower troughs positioned in side-by-side, coplanar and spaced apart relationship to each other; a plurality of discharge apertures in the lower troughs for permitting the discharge of liquid from the lower troughs when the liquid is present therein; an inlet in each of said lower troughs for permitting the entry of liquid into the lower troughs; a lower parting box positioned above and extending across the lower troughs; a plurality of discharge openings in the lower parting box that are positioned in fluid communication with the inlets in the lower troughs for delivering fluid when present in the lower parting box to each of the lower troughs; and an inlet in the lower parting box for permitting the entry of liquid into the lower parting box. The two-stage liquid distribution device also includes an upper distributor spaced above the lower distributor and comprising: a plurality of elongated, enclosed upper troughs positioned in side-by-side, coplanar and spaced apart relationship to each other; a plurality of discharge apertures in the upper troughs for permitting the discharge of liquid from the upper troughs when the liquid is present therein; an inlet in each of said upper troughs for permitting the entry of liquid into the upper troughs; an upper parting box positioned above and extending across the upper troughs; a plurality of discharge openings in the upper parting box that are positioned in fluid communication with the inlets in the upper troughs for delivering fluid when present in the upper parting box to each of the upper troughs; an inlet in the upper parting box for permitting the entry of liquid into the upper parting box; and a primary outlet in the upper parting box for permitting liquid when in the upper parting box to exit therefrom. The two-stage liquid distribution device further includes an upper downpipe section extending downwardly to the upper parting box and in fluid communication with the inlet of the upper parting box; a lower downpipe section extending downwardly from the upper parting box to the lower parting box and in fluid communication with the primary outlet in the upper parting box and the inlet in the lower parting box for delivering liquid from the upper parting box when present therein to the lower parting box; and flow restrictors positioned in the upper parting box and constructed to inhibit liquid when descending through the upper parting box from being distributed laterally within the upper parting box and permitting said lateral distribution when the liquid has filled the lower distributor and the lower downpipe section.

In another aspect, the invention is directed to a mass transfer column comprising: an upright shell defining an open internal area; and the two-stage liquid distribution device described above positioned within the open internal area.

In a further aspect, the invention is directed to a method of distributing liquid within a mass transfer column as described above, comprising the steps of: controlling a volumetric flow rate of liquid to the two-stage liquid distribution device to cause liquid to fill the lower parting box and the lower troughs and create a pressure head in the lower downpipe section that pressurizes the liquid in the lower parting box and the lower troughs; and discharging the pressurized liquid from the lower troughs through the discharge apertures in the lower troughs into an upper end of a mass transfer bed positioned below the lower distributor. The method may include the additional steps of controlling the volumetric flow rate of liquid to the two-stage liquid distribution device to cause liquid to fill the lower downpipe section, the upper parting box, and the upper troughs and create a pressure head in the upper downpipe section that pressurizes the liquid in the upper parting box and the upper troughs and then discharging the pressurized liquid through the discharge apertures in the upper troughs into the upper end of the mass transfer bed positioned below the lower distributor.

BRIEF DESCRIPTION OF DRAWINGS

In the accompany drawings that form part of the specification and in which like reference numerals are used to indicate like components in the various views.

FIG. 1 is a side perspective view of a mass transfer column having portions of its shell broken away to show a two-stage liquid distribution device and other internals positioned within an open internal region of the mass transfer column.

FIG. 2 is an enlarged, fragmentary, top perspective view of the mass transfer column shown in FIG. 1 and showing the two-stage liquid distribution device and a liquid collector.

FIG. 3 is an enlarged, fragmentary, bottom perspective view of the mass transfer column shown in FIG. 1 and showing the two-stage liquid distribution device and a liquid collector;

DESCRIPTION OF EMBODIMENTS

Figure 1:
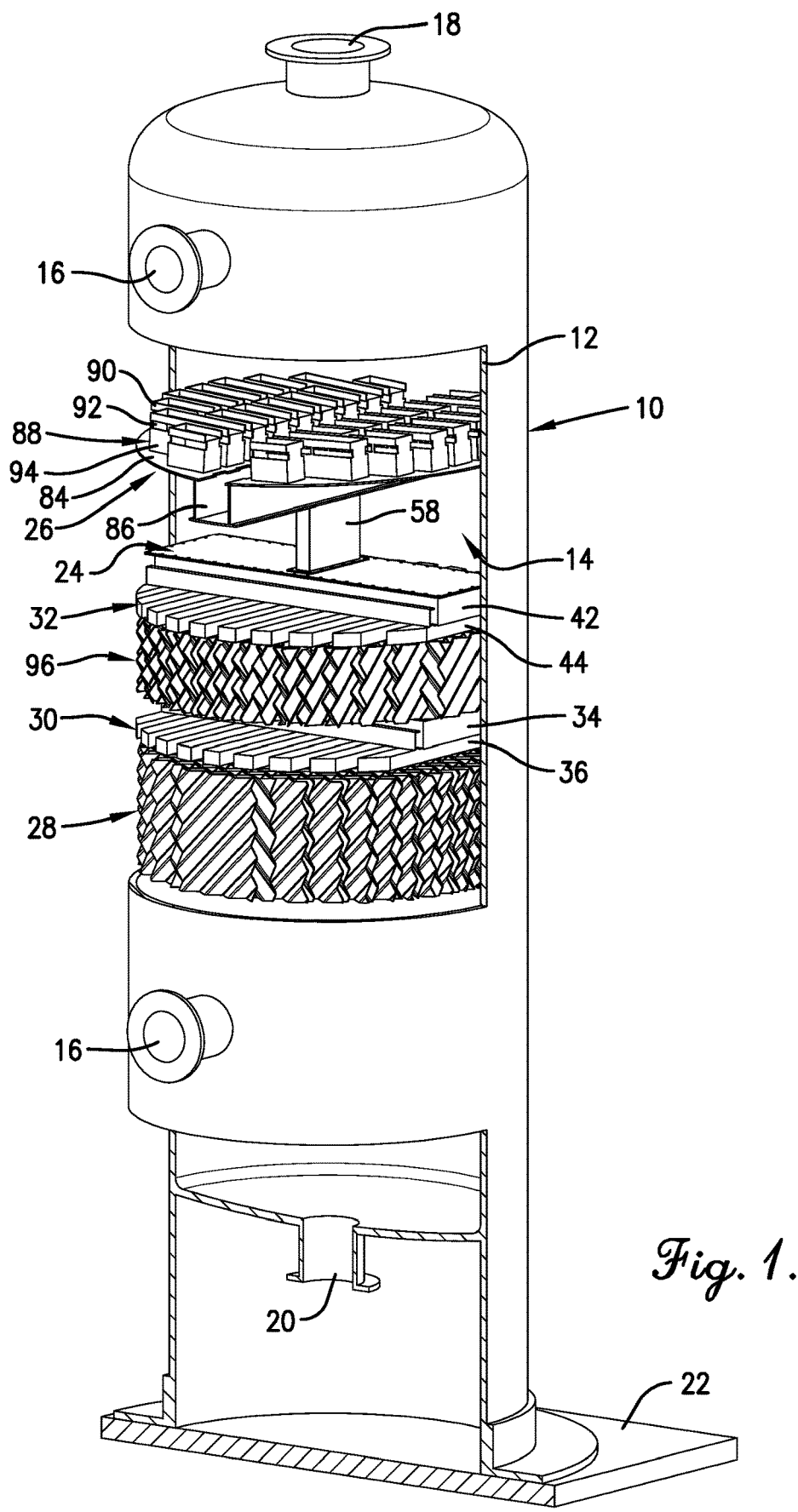
FIG. 1
Figure 2:
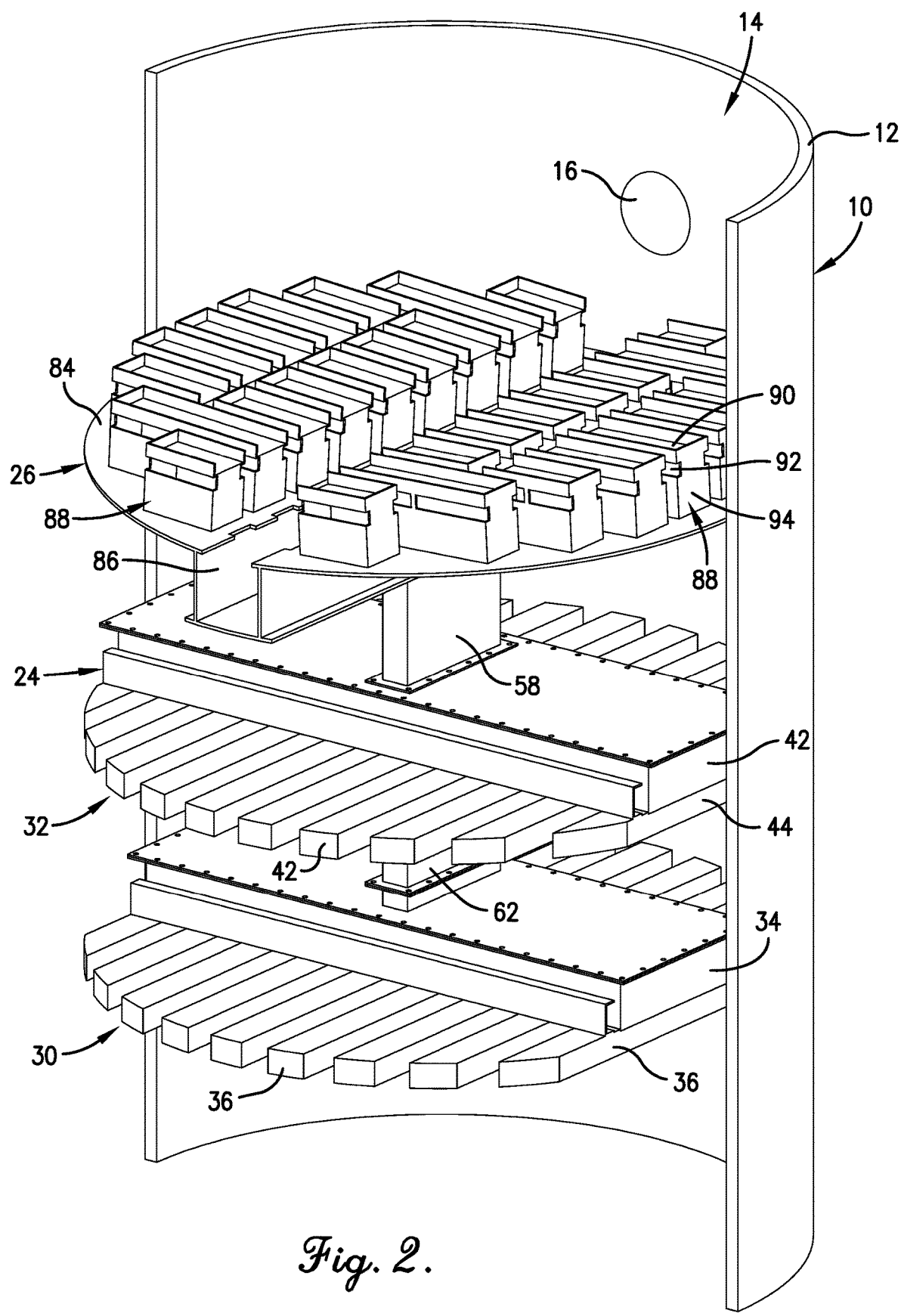
FIG. 2
Figure 3:
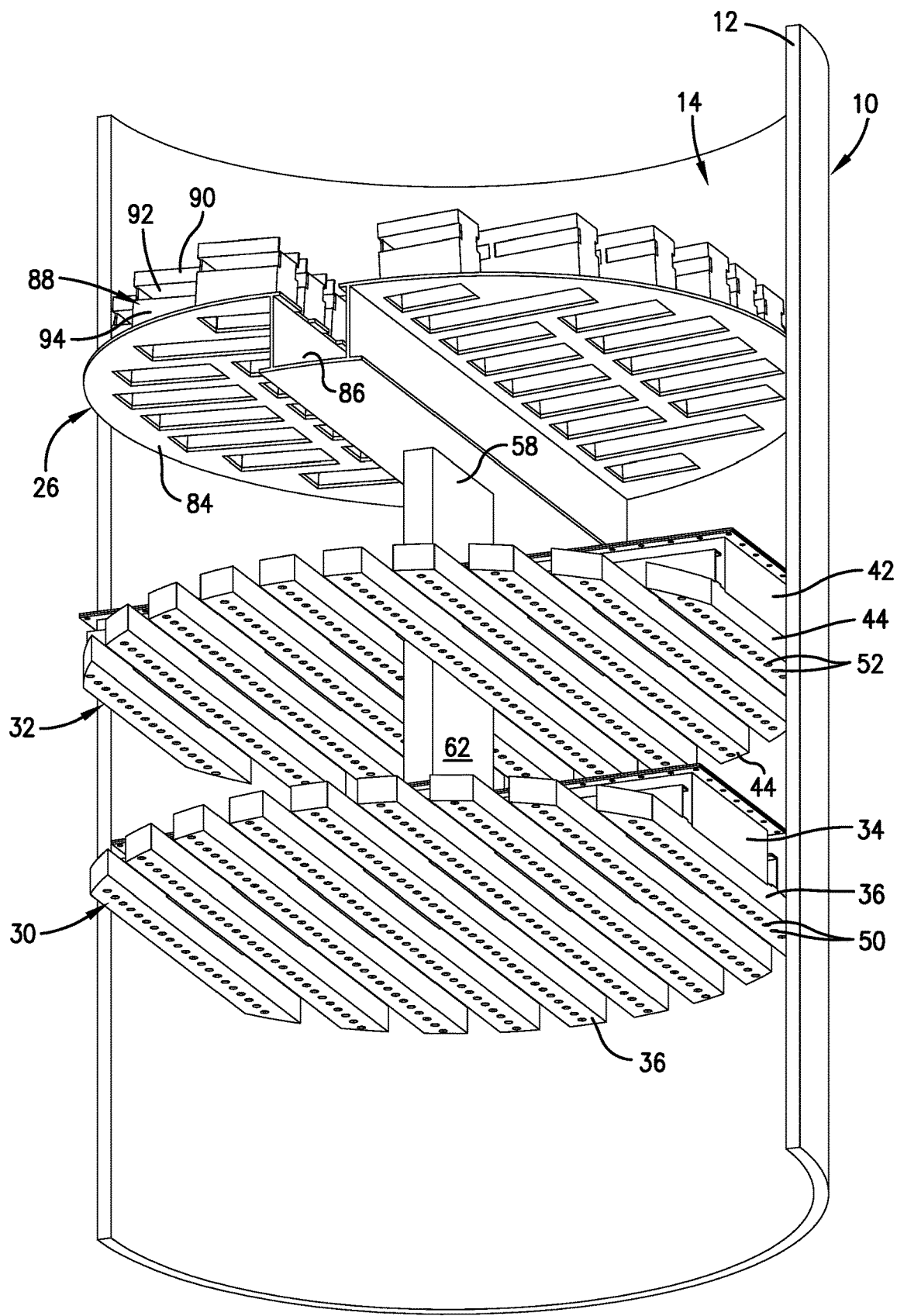
FIG. 3

Turning now to the drawings in greater detail, and initially to FIG. 1, a mass transfer column is designated generally by the numeral 10 and includes an upright cylindrical shell 12 that defines an open interior region 14. The shell 12 is of any suitable diameter and height, and is constructed from suitably rigid materials that are preferably inert to, or otherwise compatible with the fluids and conditions present within the mass transfer column 10. Although the shell 12 of the mass transfer column 10 is shown in a cylindrical configuration, other shapes, including polygonal, may be used.

The mass transfer column 10 is of a type used to process fluid streams, including to obtain fractionation products. Specific processes include, but are not limited to, gas dehydration, sour gas treatment, and gas fractionation. Normally, the fluid streams comprise one or more ascending vapor streams and one or more descending liquid streams. The fluid streams are directed into the mass transfer column 10 through any number of feed lines 16 positioned at appropriate locations along the height of the mass transfer column 10. One or more vapor streams can also be generated within the mass transfer column 10 rather than being introduced into the mass transfer column 10 through the feed lines 16. The mass transfer column 10 will also typically include an overhead line 18 for removing a vapor product or byproduct and a bottom stream takeoff line 20 for removing a liquid product or byproduct from the mass transfer column 10. Other column components that are typically present, such as feed points, sidedraws, reflux stream lines, reboilers, condensers, vapor horns, liquid distributors, and the like, are not illustrated in the drawings because an illustration of these components is not believed to be necessary for an understanding of the present invention.

The mass transfer column 10 is positioned on a platform 22 that is shown somewhat schematically. In one embodiment, the platform 22 may be stationary, such as in an onshore installation. In another particularly relevant embodiment, the platform 22 may be non-stationary, such as in an off-shore installation. Examples of off-shore installations for the mass transfer column 10 include floating platforms or vessels, such as floating production storage and offloading (FPSO) platforms or vessels and floating liquefied natural gas (FLNG) vessels.

Turning additionally to FIGS. 2-6, a two-stage liquid distribution device 24 of the present invention is positioned within the open interior region 14 of the shell 12 and is associated with an overlying liquid collector 26 and an underlying mass transfer bed 28 (FIG. 1). The two-stage liquid distribution device 24 utilizes a hydraulic head to create a pressurized discharge of liquid and thereby facilitate a more uniform horizontal distribution of liquid to an upper end of the underlying mass transfer bed 28. This distribution of liquid is achievable even when the mass transfer column 10 is subjected to rocking motions as a result of wave and/or wind loads that would normally cause a maldistribution of the liquid entering the upper end of the mass transfer bed 28.

The two-stage liquid distribution device 24 comprises a lower distributor 30 and an upper distributor 32 that are vertically spaced apart from each other and are of similar construction to each other. The lower distributor 30 comprises a lower parting box 34 that is in fluid communication with a plurality of underlying lower troughs 36 that extend across the cross-section of the shell 12. The lower troughs 36 are positioned in side-by-side, coplanar and spaced apart relationship to each other and extend end-to-end or longitudinally between opposite sides of the shell 12. The lower parting box 34 is positioned above and extends across each of the lower troughs 36. In one embodiment, the lower parting box 34 extends in a longitudinal direction that is perpendicular to a longitudinal direction of the lower troughs 36 and may extend along a diameter of the shell 12.

Both the lower parting box 34 and the lower troughs 36 are enclosed to prevent liquid from sloshing out of lower parting box 34 and the lower troughs 36 and to allow pressurization of liquid when present within those structures. In one embodiment, fluid communication between the lower parting box 34 and the lower troughs 36 is obtained by a plurality of discharge openings 38 in the lower parting box 34 that communicate with a plurality of inlets 40 in the lower troughs 36. When liquid is present in the lower parting box 34, it is delivered by the discharge openings 38 in the lower parting box 34 to the inlets 40 of the lower troughs 36, which in turn permit entry of the liquid into the lower troughs 36. The liquid communication between the discharge openings 38 and the inlets 40 can be achieved in one embodiment by positioning the lower parting box 34 on top of the lower troughs 36 with the discharge openings 38 in fluid-tight alignment with the inlets 40.

The upper distributor 32 comprises an upper parting box 42 that is in fluid communication with a plurality of underlying upper troughs 44 that extend across the cross-section of the shell 12. The upper troughs 44 are positioned in side-by-side, coplanar and spaced apart relationship to each other and extend end-to-end or longitudinally between opposite sides of the shell 12. The upper parting box 42 is positioned above and extends across each of the upper troughs 44. In one embodiment, the upper parting box 42 extends in a longitudinal direction that is perpendicular to a longitudinal direction of the upper troughs 44 and may extend along a diameter of the shell 12.

Both the upper parting box 42 and the upper troughs 44 are enclosed to prevent liquid from sloshing out of upper parting box 42 and the upper troughs 44 and to allow pressurization of liquid when present within those structures. In one embodiment, fluid communication between the upper parting box 42 and the upper troughs 44 is obtained by a plurality of discharge openings 46 in the upper parting box 42 that communicate with a plurality of inlets 48 in the upper troughs 44. When liquid is present in the upper parting box 42, it is delivered by the discharge openings 46 in the upper parting box 42 to the inlets 48 of the upper troughs 44, which in turn permit entry of the liquid into the upper troughs 44. The liquid communication between the discharge openings 46 and the inlets 48 can be achieved in one embodiment by positioning the upper parting box 42 on top of the upper troughs 44 with the discharge openings 46 in fluid-tight alignment with the inlets 48.

A plurality of discharge apertures 50 and 52 are provided in each of the lower troughs 36 and the upper troughs 44, respectively, for permitting the discharge of liquid from the lower troughs 36 and the upper troughs 44 when the liquid is present therein. The discharge apertures 50 and 52 are arranged in spaced-apart relationship within each of the respective lower troughs 36 and upper troughs 44. A total open area of the plurality of discharge apertures 52 in the upper troughs 44 may be the same or different than a total open area of the plurality of discharge apertures 50 of the lower troughs 36. The total open area can be varied by changing the number of discharge apertures 50 and 52 and/or by changing the orifice size of the discharge apertures 50 and 52. The discharge apertures 50 and 52 are placed in a floor of the respective lower troughs 36 and upper troughs 44 in the illustrated embodiments. In other embodiments, the discharge apertures 50 and/or 52 may be positioned in sidewalls of the lower troughs 36 and/or upper troughs 44.

In one embodiment, the upper troughs 44 are positioned in a staggered relationship with respect to the lower troughs 36, such that the upper troughs 44 are vertically aligned with the spacings between the lower troughs 36 and vice versa. The staggered placement of the upper troughs 44 in relation to the lower troughs 36 allows the discharge apertures 52 of the upper troughs 44 to discharge liquid downwardly through the spacings between adjacent ones of the lower troughs 36 for delivery to the upper end of the mass transfer bed 28. The discharge apertures 50 and 52 are normally arranged to provide a uniform horizontal distribution of liquid to the upper end of the underlying mass transfer bed 28. The number of lower troughs 36 and the number of upper troughs 44 are selected in combination with the number and placement of discharge apertures 50 and 52 to provide the desired drip-point density of liquid delivered to the upper end of the underlying mass transfer bed 28. The mass transfer bed 28 comprises one or more types of mass transfer devices, including the illustrated structured packing comprising corrugated sheets in which adjacent sheets are arranged in a cross-corrugated fashion. Examples of mass transfer devices that may be used in other embodiments include grid or random packing.

Figure 6:
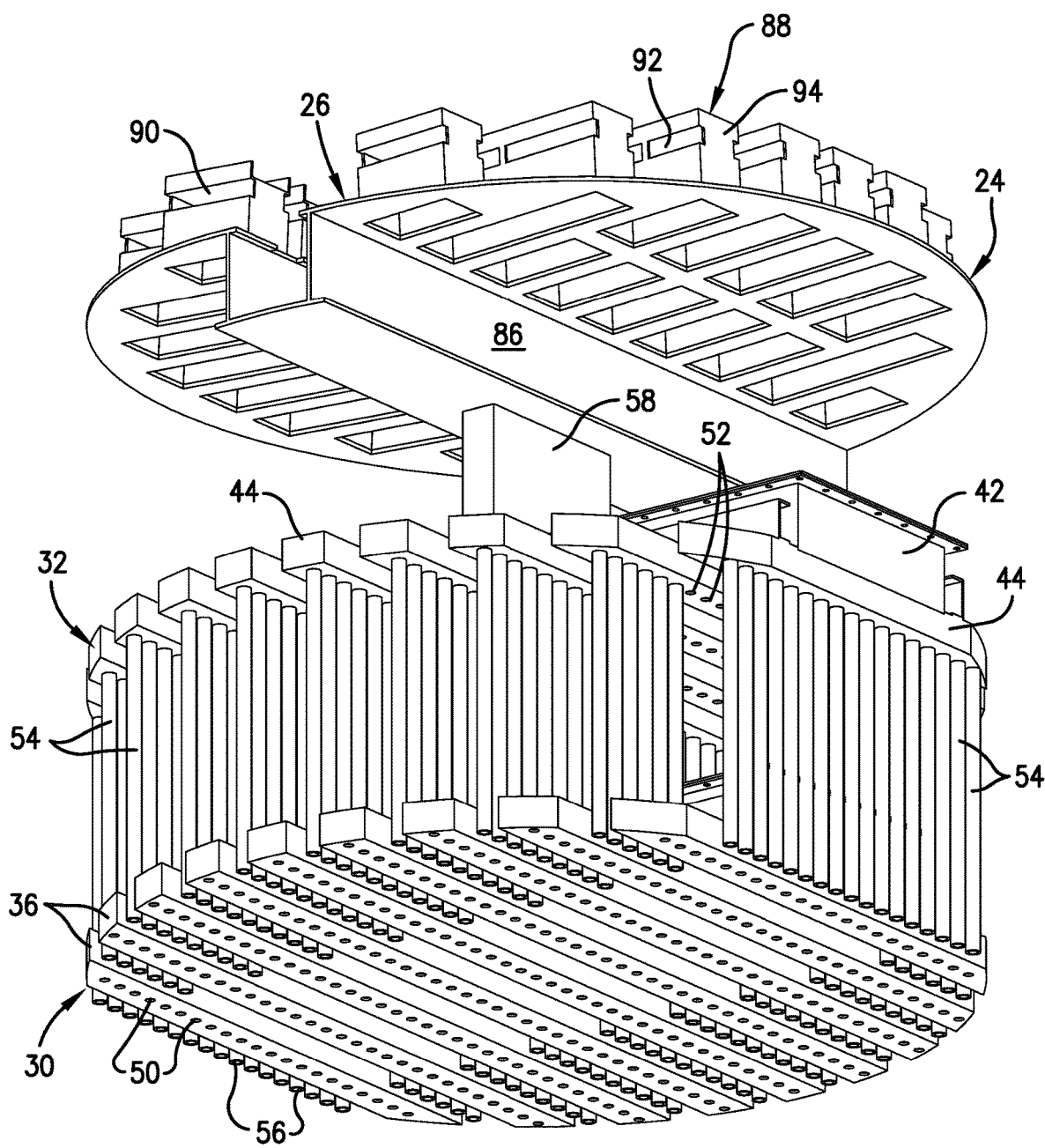
FIG. 6 is a bottom perspective view of an alternate embodiment of the two-stage liquid distribution device that employs drip tubes and the liquid collector.

In the embodiment shown in FIG. 6, drip tubes 54 may be provided to receive liquid when it is discharged from the discharge apertures 52 of the upper troughs 44 and convey it to a lower elevation while shielding the liquid from the ascending vapor that might otherwise cause entrainment of the liquid or impede its intended passage between the lower troughs 36. The drip tubes 54 extend downwardly from the discharge apertures 52 and each drip tube 54 has a lower discharge end 56. A few of the drip tubes 54 are removed in FIG. 6 to show the discharge apertures 52. In the illustrated embodiment, the lower discharge ends 56 of the drip tubes 54 are positioned coplanar with the discharge apertures 50 of the lower troughs 36. In other embodiments, the lower discharge ends 56 of the drip tubes 54 may be positioned above or even below the plane of the discharge apertures 50 of the lower troughs 36.

Figure 4:
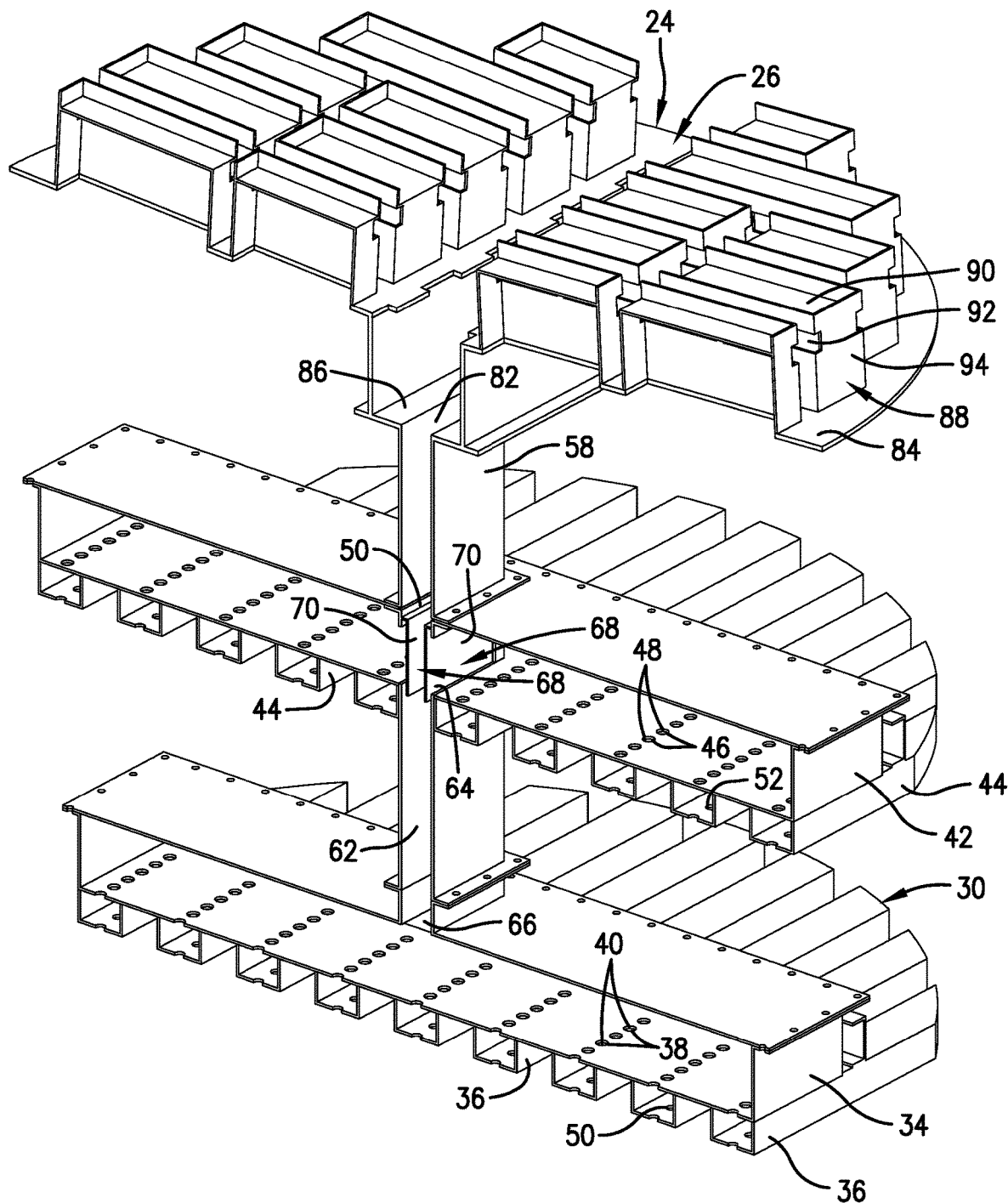
FIG. 4 is a top perspective view of the two-stage liquid distribution device and the liquid collector of FIGS. 1-3 and shown on a further enlarged scale.

Turning specifically to FIG. 4, liquid is delivered to the upper parting box 42 of the upper distributor 32 by an upper downpipe section 58 that is in liquid communication with an inlet 60 in the upper parting box 42. A lower downpipe section 62 extends downwardly from the upper parting box 42 to the lower parting box 36 and is in fluid communication with a primary outlet 64 in the upper parting box 42 and an inlet 66 in the lower parting box 36 for delivering liquid from the upper parting box 42 when it is present therein to the lower parting box 36. The upper downpipe section 58 and the lower downpipe section 62 may be formed as separate pieces, as in the illustrated embodiment, or they may be portions of a single downpipe.

Flow restrictors 68 are positioned within the upper parting box 42 and are constructed to inhibit liquid when it is descending through the upper parting box 42 from being distributed laterally within the upper parting box 42. The flow restrictors 68 are also constructed to permit the lateral distribution of the liquid within the upper parting box 42 when the liquid has filled the lower distributor 30 and the lower downpipe section 62. In one embodiment, the flow restrictors 68 are plates 70 joined at an upper end in generally fluid-tight relationship to the inlet 60 in the upper parting box 42 and spaced inwardly from a perimeter of the primary outlet 64 in the upper parting box 42. In this manner, the plates 70 funnel the descending liquid from the inlet 60 to the primary outlet 64 in the upper parting box 42, and permit the ascending liquid level to rise in the spacing between the plates 70 and the perimeter of the primary outlet 64 for lateral distribution within the upper parting box 42. The liquid flow between the plates 70 and the perimeter of the primary outlet 64 is represented by the arrows 72 in FIG. 5.

The liquid level rises to the upper distributor 32 when the volumetric flow rate of the liquid is controlled so that it exceeds the rate of discharge through the discharge apertures 50 in the lower troughs 36 of the lower distributor 30. The flow restrictors 68 thus prevent or inhibit discharge of liquid from the discharge apertures 52 of the upper troughs 44 of the upper distributor 32 until after a sufficient volumetric flow of liquid has been achieved to exceed the discharge rate from the lower distributor 30 and cause the liquid level to rise up the lower downpipe section 62 to the upper parting box 42 of the upper distributor 32. The liquid head above the lower distributor 30 causes a pressurized discharge of liquid from the discharge apertures 50 in the lower troughs 36. This liquid head and pressurized discharge reduces any maldistribution of liquid delivered by the lower distributor 30 to the mass transfer bed 28 that might otherwise result from rocking motion of the mass transfer column 10.

Figure 5:
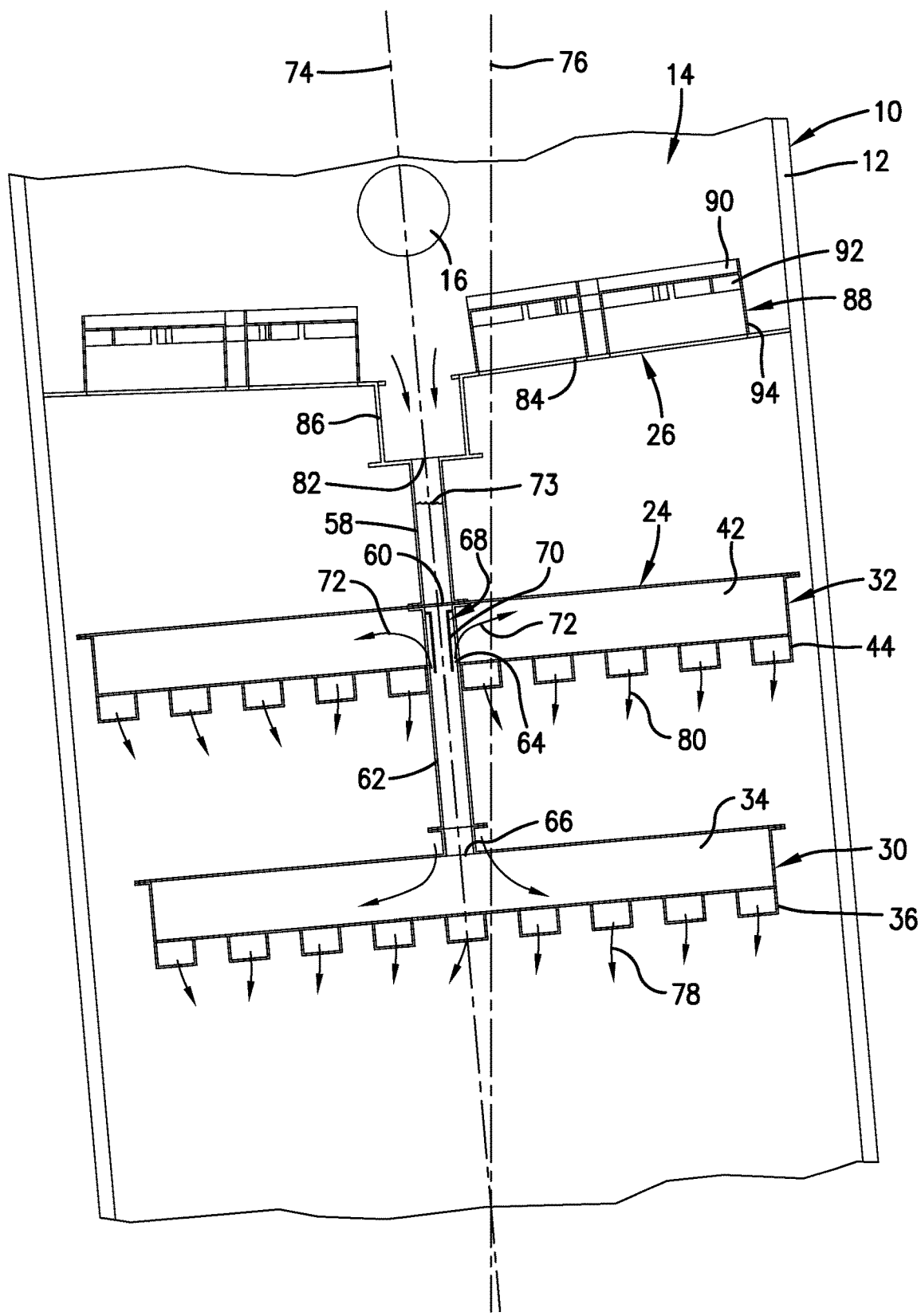
FIG. 5 is a fragmentary, side elevation view of the mass transfer column shown in FIG. 1 and illustrating tilting movement of the mass transfer column that may occur as a result of wave and/or wind loading.

In the embodiment illustrated in FIG. 5, the volumetric flow rate of the liquid is controlled so that the liquid level 73 rises above the upper distributor 32 into the upper downpipe section 58 so that the liquid head causes a pressurized discharge of liquid from both the discharge apertures 50 in the lower troughs 36 and the discharge apertures 52 in the upper troughs 42. Any maldistribution of liquid exiting both the upper distributor 32 and the lower distributor 30 that might otherwise result from rocking motion of the mass transfer column 10 is thus further reduced. The rocking motion of the mass transfer column 10 and the pressurized discharge of liquid are illustrated in FIG. 5 where a longitudinal center axis 74 of the mass transfer column 10 is shown tilted at an angle from a vertical axis 76 and the liquid discharge from the lower distributor 30 is represented by the arrows 78 and the liquid discharge from the upper distributor 32 are represented by the arrows 80. The staging of liquid discharge from the lower distributor 30 and then the upper distributor 32 allows the desired uniform delivery of liquid to the upper end of the mass transfer bed 28 to be obtained across a greater range of volumetric liquid flow rates than if only a single distributor was used.

The liquid collector 26 is an optional component of the two-stage liquid distribution device 24 because the liquid can be delivered to the upper downpipe section 58 from feed-pipes or other structures. In the illustrated embodiment, the liquid collector 26 is positioned above the upper liquid distributor 32 and includes an outlet 82 for delivering liquid collected by the liquid collector 26 to the upper downpipe section 58. The liquid collector 26 may comprise a floor plate 84 that is sloped centrally and downwardly toward a sump 86 containing the outlet 82. The liquid collector may also include vapor risers 88 that extend upwardly from the floor plate 84. The vapor risers 86 may include caps 90 that block liquid from descending into the vapor risers 88 and vapor outlets 92 positioned below the caps 90 in sidewalls 94 of the vapor risers 88.

Another optional component of the two-stage liquid distribution device 24 is a secondary mass transfer bed 96 as shown in FIG. 1 that may be positioned between the upper troughs 44 of the upper distributor 32 and the lower parting box 34 of the lower distributor 30. The second mass transfer bed 96 receives the liquid discharged from the upper troughs 44 to allow for mass transfer with vapor ascending through the secondary mass transfer bed 96. The secondary mass transfer bed 96, like mass transfer bed 28, comprises one or more types of mass transfer devices, including the illustrated structured packing comprising corrugated sheets in which adjacent sheets are arranged in a cross-corrugated fashion. Examples of mass transfer devices that may be used in other embodiments include grid or random packing.

The invention includes a method of distributing liquid within the mass transfer column 10 by controlling a volumetric flow rate of liquid to the two-stage liquid distribution device 24 to cause liquid to fill the lower parting box 34 and the lower troughs 36 and create a pressure head in the lower downpipe section 62. This pressure head pressurizes the liquid in the lower parting box 34 and the lower troughs 36. The pressurized liquid is then discharged from the lower troughs 36 through the discharge apertures 50 in the lower troughs 36 into an upper end of a mass transfer bed 28 positioned below the lower distributor 30. In a second stage, the method includes controlling the volumetric flow rate of liquid to the two-stage liquid distribution device 24 to cause liquid to fill the lower downpipe section 62, the upper parting box 42, and the upper troughs 44 and create a pressure head in the upper downpipe section 58 that pressurizes the liquid in the upper parting box 42 and the upper troughs 44 and then discharging the pressurized liquid through the discharge apertures 52 in the upper troughs 44 into the upper end of the mass transfer bed 28 that is positioned below the lower distributor 30 or the secondary mass transfer bed 96 that may be positioned between the upper distributor 32 and the lower distributor 30. The drip tubes 54 may be used to shield the liquid against the flow of ascending vapor as the liquid travels from the discharge apertures 52 in the upper troughs 44 to the mass transfer bed 28. By creating the pressure head above the lower distributor 30 and then the upper distributor 32, the liquid discharged from the lower distributor 30 and then additionally from the upper distributor 32 is less likely to suffer from maldistribution that would otherwise result from rocking of the mass transfer column 10 when subjected to wave and/or wind loads.

From the foregoing, it will be seen that this invention is one well adapted to attain all the ends and objectives hereinabove set forth together with other advantages that are inherent to the structure.

It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative and not in a limiting sense.

The invention claimed is:

1. A two-stage liquid distribution device for use in an internal region of a mass transfer column, said two-stage liquid distribution device comprising:
   a lower distributor comprising:
      a plurality of elongated, enclosed lower troughs positioned in side-by-side, coplanar and spaced apart relationship to each other;
      a plurality of discharge apertures in the lower troughs for permitting the discharge of liquid from the lower troughs when the liquid is present therein;
      an inlet in each of said lower troughs for permitting the entry of liquid into the lower troughs;
      a lower parting box positioned above and extending across the lower troughs;
      a plurality of discharge openings in the lower parting box that are positioned in fluid communication with the inlets in the lower troughs for delivering fluid when present in the lower parting box to each of the lower troughs; and
      an inlet in the lower parting box for permitting the entry of liquid into the lower parting box;
   an upper distributor spaced above the lower distributor and comprising:
      a plurality of elongated, enclosed upper troughs positioned in side-by-side, coplanar and spaced apart relationship to each other;
      a plurality of discharge apertures in the upper troughs for permitting the discharge of liquid from the upper troughs when the liquid is present therein;
      an inlet in each of said upper troughs for permitting the entry of liquid into the upper troughs;
      an upper parting box positioned above and extending across the upper troughs;
      a plurality of discharge openings in the upper parting box that are positioned in fluid communication with the inlets in the upper troughs for delivering fluid when present in the upper parting box to each of the upper troughs;
      an inlet in the upper parting box for permitting the entry of liquid into the upper parting box; and
      a primary outlet in the upper parting box for permitting liquid when in the upper parting box to exit therefrom;
   an upper downpipe section extending downwardly to the upper parting box and in fluid communication with the inlet of the upper parting box;

a lower downpipe section extending downwardly from the upper parting box to the lower parting box and in fluid communication with the primary outlet in the upper parting box and the inlet in the lower parting box for delivering liquid from the upper parting box when present therein to the lower parting box; and flow restrictors positioned in the upper parting box and constructed to inhibit liquid when descending through the upper parting box from being distributed laterally within the upper parting box and permitting said lateral distribution when the liquid has filled the lower distributor and the lower downpipe section.

2. The two-stage liquid distribution device of claim 1, wherein the upper troughs are vertically aligned with spacings between the lower troughs.

3. The two-stage liquid distribution device of claim 2, wherein a total open area of the plurality of discharge apertures in the upper troughs is the same as a total open area of the plurality of discharge apertures in the lower troughs.

4. The two-stage liquid distribution device of claim 2, wherein a total open area of the plurality of discharge apertures in the upper troughs is different than a total open area of the plurality of discharge apertures in the lower troughs.

5. The two-stage liquid distribution device of claim 2, including a liquid collector positioned above the upper liquid distributor and having an outlet for delivering liquid when collected by the liquid collector to said upper downpipe section.

6. The two-stage liquid distribution device of claim 5, wherein said liquid collector comprises a floor plate sloped downwardly toward said outlet and vapor risers extending upwardly from said floor plate.

7. The two-stage liquid distribution device of claim 2, including drip tubes extending downwardly from the discharge apertures in the upper troughs to receive liquid when discharged from discharge apertures of the upper troughs and convey the liquid downwardly for discharge at a lower discharge end of each of the drip tubes.

8. The two-stage liquid distribution device of claim 2, including mass transfer devices positioned between said upper and lower distributors at locations to receive liquid when discharged from said discharge apertures in the upper troughs.

9. The two-stage liquid distribution device of claim 2, wherein said upper parting box extends in a longitudinal direction that is perpendicular to a longitudinal direction of the upper troughs and said lower parting box extends in a longitudinal direction that is perpendicular to a longitudinal direction of the lower troughs.

10. A mass transfer column comprising:
an upright shell defining an open internal area; and
a two-stage liquid distribution device of claim 1 positioned within said open internal area.

11. The mass transfer column of claim 10, wherein the upper troughs are vertically aligned with spacings between the lower troughs.

12. The mass transfer column of claim 11, including mass transfer devices positioned below the lower distributor at locations to receive liquid when discharged from said discharge apertures in the lower troughs.

13. The mass transfer column of claim 12, wherein said mass transfer devices comprise random or structured packings.

14. The mass transfer column of claim 12, wherein the two-stage liquid distribution device includes other ones of the mass transfer devices positioned between said upper and lower distributors at locations to receive liquid when discharged from said discharge apertures in the upper troughs.

15. The mass transfer column of claim 12, wherein said two-stage liquid distribution device includes a liquid collector positioned above the upper liquid distributor and having an outlet for delivering liquid when collected by the liquid collector to said upper downpipe section.

16. The mass transfer column of claim 15, wherein said liquid collector comprises a floor plate sloped downwardly toward said outlet and vapor risers extending upwardly from said floor plate.

17. The mass transfer column of claim 16, including drip tubes extending downwardly from the discharge apertures in the upper troughs to receive liquid when discharged from discharge apertures of the upper troughs and convey the liquid downwardly for discharge at a lower discharge end of each of the drip tubes.

18. A method of distributing liquid within a mass transfer column of claim 15, comprising the steps of:
controlling a volumetric flow rate of liquid to the two-stage liquid distribution device to cause liquid to fill the lower parting box and the lower troughs and create a pressure head in the lower downpipe section that pressurizes the liquid in the lower parting box and the lower troughs; and
discharging the pressurized liquid from the lower troughs through the discharge apertures in the lower troughs into an upper end of a mass transfer bed positioned below the lower distributor.

19. The method of claim 18, including controlling the volumetric flow rate of liquid to the two-stage liquid distribution device to cause liquid to fill the lower downpipe section, the upper parting box, and the upper troughs and create a pressure head in the upper downpipe section that pressurizes the liquid in the upper parting box and the upper troughs and then discharging the pressurized liquid through the discharge apertures in the upper troughs into the upper end of the mass transfer bed positioned below the lower distributor.

20. The method of claim 19, including flowing the pressurized liquid from the discharge apertures in the upper troughs downwardly through drip tubes.

* * * * *